Dec. 28, 1937.  R. H. FISHER  2,103,356

ELECTRIC MOTOR

Filed Dec. 5, 1935

INVENTOR
ROBERT H. FISHER
BY
Mueller & Ruhl
ATTORNEYS

Patented Dec. 28, 1937

2,103,356

UNITED STATES PATENT OFFICE 2,103,356

ELECTRIC MOTOR

Robert H. Fisher, New York, N. Y., assignor to Whiting Holding Company, Minneapolis, Minn., a corporation of Minnesota Application December 5, 1935, Serial No. 52,986

2 Claims. (Cl. 172—275)

This invention relates to improvements in electric motors and has particular reference to an alternating current motor.

An object of the invention is to provide a synchronous motor of simple and practical design in which the primary side thereof may be excited from a source of alternating current which has been rectified to provide a unidirectional pulsating current.

Another and more specific object is to interpose between the stator or stators of a motor and a source of alternating current therefor, a rectifier or rectifiers which will convert said current into partial wave, unidirectional pulsations for the exciting coils of said stator or stators, and to introduce a reactance into the circuit of one of said coils to render the motor self-starting.

A further object is to provide a synchronous motor with a plurality of stators, certain of which are normally inactive while the others are connected through a rectifier to a source of alternating current to produce unidirectional pulsations in the exciting coils of said other stators, there being means to also connect said normally inactive stators to said source through said rectifier whereby an increase in the torque of the motor may be effected.

The above and other objects will appear more clearly from the following detailed description when taken in connection with the accompanying drawing which illustrates preferred embodiments of the inventive idea.

Figure 1:
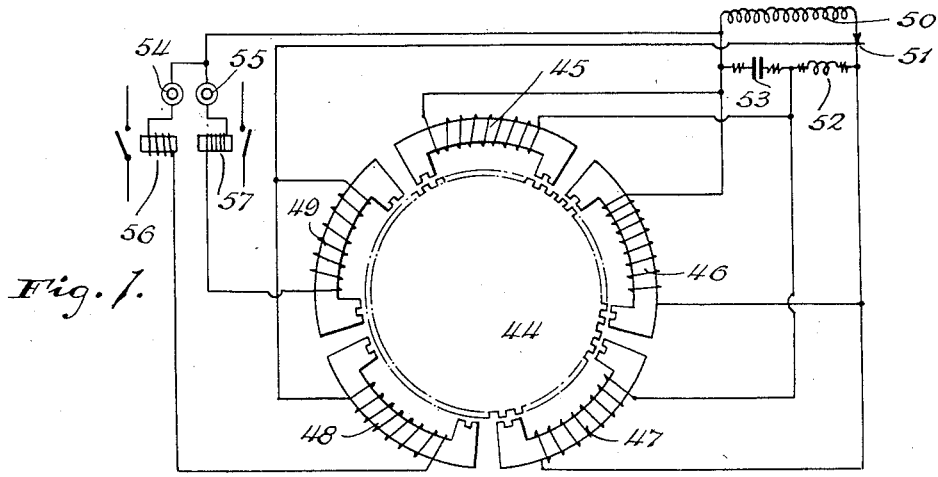
Fig. 1 is a diagrammatic view of a synchronous motor of the reluctance type and associated circuits wherein an embodiment of my invention is incorporated.

In the drawing, the invention is shown in its application to a synchronous motor of the reluctance type, comprising a rotor having a series of teeth or pole pieces and slots about its periphery. Associated with the rotor are a plurality of respectively independent stator units, the magnetic member of each thereof being provided with teeth and slots generally corresponding to those of the rotor. The stators, which constitute the primary elements of the motor, are each provided with an excitation coil connected to a source of electrical energy by suitable conductors.

In accordance with the present invention, it is proposed to excite the stator coils by unidirectional pulsations derived from a source of alternating current through the interposition between said elements of a half-wave rectifier. This rectifier changes the alternating current into a pulsating direct current which will produce unidirectional impulses that will have the effect of simulating, in the case of a 60-cycle alternating current, a synchronous motor speed equivalent to that which would be produced by a 30-cycle alternating current. When the ordinary synchronous motor is made to rotate at or near synchronous speed, the magnetic flux created by the exciting current, also pulsates in synchronism and will keep the motor revolving at a synchronous speed which will be equivalent to the number of pulsations per minute divided by the number of teeth or slots on the periphery of the rotor. Thus, assuming that a 60-cycle alternating current is used and further assuming that the rotor has sixty teeth and sixty slots, there would be produced 7,200 pulsations, which divided by sixty, would yield 120 R. P. M. Now when the same motor has associated with it a half-wave rectifier, half of the pulsations are eliminated and the motor would therefore receive only 3,600 pulsations per minute with the result that the speed of the motor is reduced to 60 R. P. M.

The motor illustrated in Figure 1 is of the self-starting type especially adapted for operating a time-piece and has means for producing additional independent excitations utilized to increase torque when it is desired to obtain additional power for short periods of time to operate other mechanisms such as audible signals, switches, electromagnetic devices and the like. As shown, the motor comprises a rotor 44 and five stators 45 to 49 inclusive, it being understood that the number of stators may be varied at will. The coil of each stator is excited independently from a source 50 of alternating current which is rectified by the rectifier 51. In order to insure proper self-starting of the motor, there is effected a phase displacement of the pulsating current. Thus the impulses for the stator 45 are caused to lag by passage of the current through the inductance 52 to the exciting coil of said stator; the stator 46 is kept in phase by direct connection of its coil to the source 50; while the stator 47 is made to lead by the connection of its coil to said source through the capacity 53. The coils of stators 48 and 49 are disconnected from the source 50 by the normally open switches or other devices 54 and 55, respectively. However, when additional power is required, the closure of said switches will connect the coils of said stators to the source 50 through the rectifier 51 with the result that the motor will be supplied with increased torque that may be utilized as suggested above. Such utilization may be accomplished through the medium of relays 56 and 57 connected in series, respectively, with the switches 54 and 55 and energized by the closure of the latter to close circuits for the accomplishment of the various additional functions. It is obvious also that it would be possible to increase the speed of the motor by using another rectifier, such as 51, and coupling the same to the stators 48 and 49 to thereby utilize the other half of the current wave.

Figure 2:
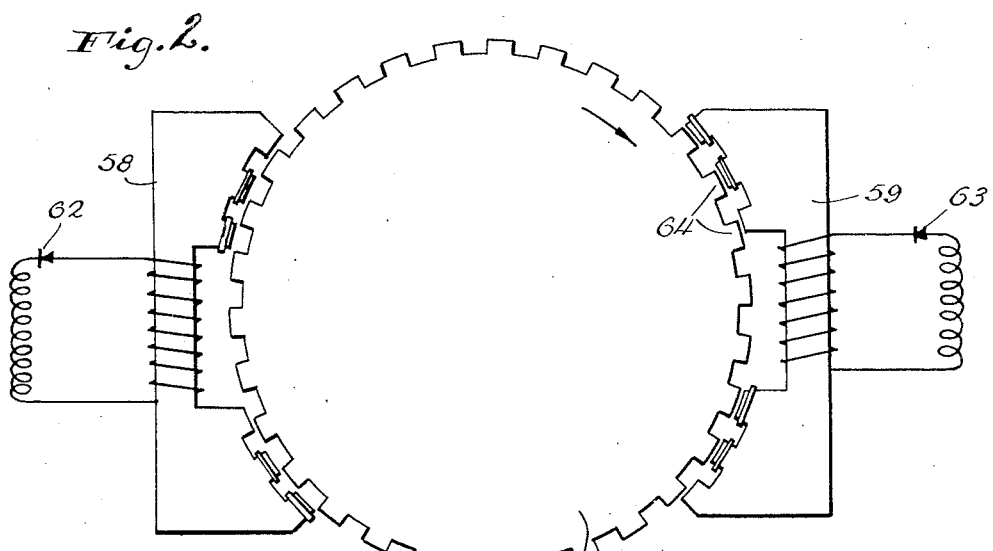
Fig. 2 is a diagrammatic view of another motor and circuit including an embodiment of my invention.

Figure 2 shows another adaptation of the reluctance type of self-starting synchronous motor in which the two stators 58 and 59 are independently supplied with unidirectional pulsations through the rectifiers 62 and 63 connected to the source of alternating current; and in which the teeth 64 of the rotor 65 co-operate with stator teeth, some of which are shaded. As illustrated, an end of one of the three teeth at one end of each of the respective stators 58 and 59 is provided with a relatively heavy shading coil or lag ring, the center tooth is provided with a substantially lighter lag ring and the remaining tooth has no lag coil. The flux in the tooth having the lighter lag coil will lag in time-phase relation behind the flux in the tooth not having a lag coil and the flux in the tooth having the heavier lag coil will lag still further. It is to be noted that the rotor teeth have a somewhat greater pitch than the stator teeth, as shown in the drawing.

Figure 3:
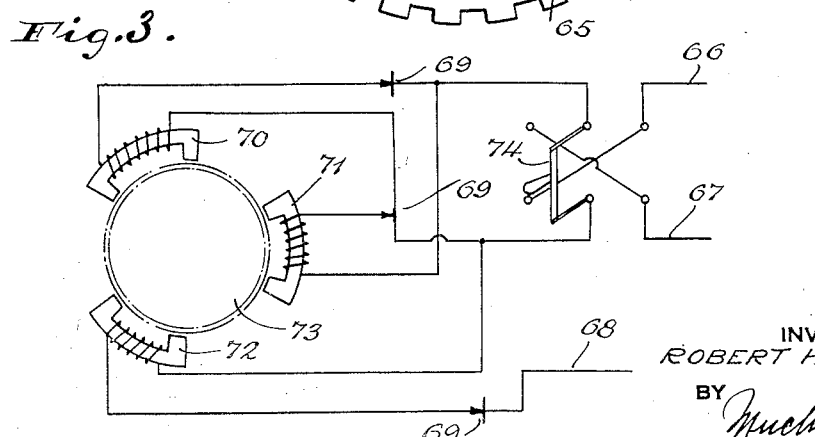
Fig. 3 is a diagrammatic view of still another motor and circuit including an embodiment of my invention.

Figure 3 illustrates a polyphase reluctance motor embodying the features of self-starting, synchronous running and reversibility. The excitation is from a three-phase source indicated by the conductors 66, 67 and 68 each of which is connected through a half-wave rectifier 69 to one of the stators 70, 71 and 72 arranged about the rotor 73. A switch 74 associated with any two of the conductors, such as the conductors 66 and 67, may be used to reverse the direction of the motor.

The additional excitation feature disclosed in Figure 1, and the self-starting feature of Figures 2 and 3 may all be effected without resort to rectification of the alternating current.

What is claimed is:

1. A motor comprising, a plurality of toothed stators each having its own individual electromagnetic exciting coil thereon, each stator being separate from and independent of the other, a toothed rotor, the respective stators being situated adjacent respectively different portions of said rotor for co-action therewith in a mutually independent manner, said coils being adapted for one thereof being normally connected to a source of electrical energy of pulsating magnitude, and lag rings of respectively different electrical conductivities encircling respective successive teeth of one of said stators whereby the magnetic fluxes in said encircled teeth will lag behind the flux in the unencircled teeth in phase-time relation and the degrees of lag in the respective encircled teeth will be respectively different.

2. A motor comprising, a plurality of toothed stators each having its own individual electromagnetic exciting coil thereon, each stator being separate from and independent of the other, a toothed rotor, the respective stators being situated adjacent respectively different portions of said rotor for co-action therewith in a mutually independent manner, said coils being adapted for one thereof being normally connected to a source of electrical energy of pulsating magnitude, the pitch of said rotor teeth being somewhat greater than the pitch of said stator teeth, and lag rings of respectively different electrical conductivities encircling respective successive teeth of one of said stators.

ROBERT H. FISHER.